United States Patent
Yeh

(10) Patent No.: US 8,090,002 B2
(45) Date of Patent: Jan. 3, 2012

(54) METHOD AND APPARATUS FOR SPREADING SIGNAL ACQUISITION AND TRACKING

(75) Inventor: Hsin-Chung Yeh, Hsinchu (TW)

(73) Assignee: Mediatek Inc., Hsin-Chu ( * ) Notice: Subject to any disclaimer, the term of this patent is extended or adjusted under 35 U.S.C. 154(b) by 1055 days.

(21) Appl. No.: 11/682,982

(22) Filed: Mar. 7, 2007

(65) Prior Publication Data

US 2008/0220736 A1 Sep. 11, 2008

(51) Int. Cl.
*H04B 1/00* (2006.01)
(52) U.S. Cl. .................................... 375/137; 375/150
(58) Field of Classification Search ............... 375/137, 375/150
See application file for complete search history.

(56) References Cited

U.S. PATENT DOCUMENTS

| | | | |
|---|---|---|---|
| 5,577,025 A * | 11/1996 | Skinner et al. | 370/209 |
| 6,725,157 B1 | 4/2004 | Yu | |
| 6,731,701 B2 | 5/2004 | Vorobiev et al. | |
| 6,879,913 B1 | 4/2005 | Yu | |
| 6,930,634 B2 | 8/2005 | Peng et al. | |
| 7,266,144 B1 * | 9/2007 | Sanders | 375/150 |
| 7,636,383 B1 * | 12/2009 | Chavez et al. | 375/150 |
| 2003/0076910 A1 * | 4/2003 | Van Wechel et al. | 375/354 |
| 2004/0239559 A1 * | 12/2004 | King et al. | 342/357.12 |
| 2005/0254560 A1 * | 11/2005 | Huang | 375/150 |
| 2006/0133463 A1 * | 6/2006 | Pietila et al. | 375/150 |
| 2007/0206663 A1 * | 9/2007 | Grover et al. | 375/147 |
| 2007/0210958 A1 * | 9/2007 | Van Wechel et al. | 342/357.12 |
| 2007/0237065 A1 * | 10/2007 | Kim et al. | 370/203 |

FOREIGN PATENT DOCUMENTS

| | | |
|---|---|---|
| CN | 1164943 | 11/1997 |
| TW | 429373 | 4/2001 |
| TW | 200534262 | 10/2005 |

* cited by examiner

*Primary Examiner* — David C. Payne
*Assistant Examiner* — Erin File

(57) ABSTRACT

A spreading signal acquisition and tracking method and apparatus is proposed. In accordance with the present invention, coherent integrations are performed by segments and stored for a non-coherent integration. A better freedom of the non-coherent interval selection is provided. The window of the non-coherent integration is sequentially and gradually shifted to achieve better update rate to its detection circuit and to improve searching and tracking for a spreading signal. By using the present invention, rapid signal acquisition can be achieved even when intensity of the spreading signal is very weak, or even when deeper signal blocking or jamming occurs.

19 Claims, 6 Drawing Sheets

METHOD AND APPARATUS FOR SPREADING SIGNAL ACQUISITION AND TRACKING

TECHNICAL FIELD OF THE INVENTION

The present invention relates to spreading signal acquisition and tracking, more particularly, to satellite signal acquisition and tracking in one or more GNSS (Global Navigation Satellite System).

BACKGROUND OF THE INVENTION

Acquisition and tracking of a spreading signal often require a period of time to integrate the received signal from the output of a match filter. If carrier phase is estimated, it is called a coherent integration. If the carrier phase information is ignored, it is called a non-coherent integration.

A long integration period is especially needed to maintain an acceptable signal-to-noise ratio (SNR) after integration when the received signal is weak. However, long integration period usually causes two problems in communication system. One problem is the update rate and loop bandwidth of phase lock loop and delay lock loop are limited. Another problem is the detection rate of the receiver is slowed down when a blocking or jamming condition happens during the integration, which causes longer reacquisition time. The coherent and non-coherent integrations are schematically shown in FIG. 1. As known in this field, an input spreading signal is de-spreading by a mixer 1 with a code replica provided by a code generator 2. I and Q components of the signal are Doppler-wiped-off by mixers 3, 4 with a carrier provided by a carrier generator 5. The processed I and Q components are integrated by integration and dump units 6 and 7 and stored in a coherent memory 9 as coherent integrations. The coherent integrations can be further accumulated in a non-coherent memory 9 as non-coherent integrations.

Coherent integration is usually used as a method of acquisition and tracking for a spreading signal under normal signal strength receiving condition. Non-coherent integration is especially useful when trying to increase dispreading gain at weak signal strength receiving condition, for example, conditions of signal path blocking, jamming or indoor.

For GPS L1 CA code acquisition, coherent integration interval is usually less than 20 ms if bit synchronization is not exactly known. At signal tracking stage or pull-in stage, the coherent integration length, $T_C$, can be extended to 20 ms after bit sync is found. In practical case, a non-coherent integration interval, which means N non-coherent integration number multiply by $T_C$ ms of coherent integration time, could be 2 seconds or even longer, for tracking or acquiring a weak GPS signal. A reference flow chart of the a conventional receiver channel operation is shown in FIG. 2, In conventional receiver design, if a receiver loses lock for a weak spreading signal during a first interval of non-coherent integration, to re-acquire the spreading signal, a second interval of non-coherent integration is required. All information of the first non-coherent integration interval is lost at the beginning of second interval of non-coherent integration.

As mentioned, to successfully acquire the weak spreading signal, a non-coherent integration of a sufficiently long interval without deeper blocking or jamming is required. That is, the integration of the weak spreading signal needs to be executed uninterruptedly, which means no sudden block or jamming, in original signal path for the sufficiently long interval. However, if deeper signal blocking or jamming occurs during the integration interval, and it fails to pass detection threshold after integration, another long period is likely to be required by the convention method.

Example is shown in FIG. 3. As shown in the drawing, deeper signal blocking or jamming occurs in the first non-coherent integration interval and persists across the second non-coherent integration interval. Therefore, as in this example, a qualified integration result (which means signal-to-noise ratio (SNR) is greater than threshold) cannot be obtained until the third integration interval is finished. In other words, it consumes three intervals to obtain a qualified integration result, which means to pass SNR detection threshold after integration. This could be a significantly long period of time for satellite signal tracking or re-acquisition. Assuming non-coherent integration interval is 2 sec, for example, a short period of blocking or jamming during integration is likely to make a receiver channel lose lock to satellite for 6 sec.

In search stage, if the deeper blocking or jamming happens on hypothesis of the right code phase and carrier frequency, more time is required for searching other hypotheses. The time length depends on total signal search range. Such a problem often happens in conventional spreading signal receiver designs. Therefore, there is a need for an improved method to shorten the time periods required for acquiring and tracking the spreading signal.

Present invention provides a solution to overcome the drawback described above.

SUMMERY OF THE INVENTION

Objective of the present invention is to provide a spreading signal receiver design method and apparatus especially used for one or more GNSS. By using the method of the present invention, rapid signal acquisition, robust signal tracking and faster signal reacquisition can be achieved. Especially when power intensity of the target satellite signal is weak or unstable, where unstable means deeper blocking or jamming occurs during signal receiving.

Spreading signal receiving method and apparatus of the present invention can increase the system dynamic bandwidth of both code and carrier wipe off design. And that is especially useful when navigate indoor or receiving under sever jamming environment. The present invention allows long integration time for acquiring or tracking weak spreading signals while it keeps sufficient or better user dynamic range compare to conventional method.

In accordance with an aspect of the present invention, the spreading signal acquisition and tracking method includes the following steps: receiving a spreading signal, which may contain satellite information from one or more GNSS simultaneously, via an antenna; down mixing the received signal to base-band; coherently integrating the down-mixed spreading signal with a specified code phase and Doppler frequency to obtain coherent integration result with a predetermined interval, say $T_C$ ms; accumulating another predetermined number N of the coherent integrations starting from a first time point to form a non-coherent integration interval; the non-coherent integration interval, in this case, equals to $T_C \times N$ ms; accumulating another numbers of the coherent integrations starting from a second time point as another non-coherent integration, said second time point being later than said first time point by a predetermined number X of the coherent integrations. It is noted that X is not necessarily equals to N in this presented invention. Preferably, X is much less than N.

In the spreading signal acquisition and tracking method, the coherent integrations are non-coherently accumulated for a signal energy detection. The signal energy is checked to see if it exceeds a threshold. If so, a specific operation (e.g. signal tracking or pull-in to track) is executed. In signal tracking stage, when the signal energy drops below the threshold, the tracking operation being executed is suspended and a re-acquisition strategy will be adopted, as shown in FIG. 2.

In accordance with another aspect of the present invention, the satellite acquisition and tracking apparatus includes an antenna for receiving a satellite signal; an RF processing block for down converting GNSS RF signal to IF (intermediate frequency) signal by using analog or digital ways; correlators for coherently integrating the received signal to obtain signal energy for each coherent integration interval; a memory device; and a processor accumulating the coherent integrations to store a first predetermined number of the coherent integrations starting from a first time point into said memory device as a non-coherent integration and store the first predetermined number of the coherent integrations starting from a second time point into said memory device as another non-coherent integration, said second time point being later than said first time point by a second predetermined number of the coherent integrations.

In the apparatus of the present invention, the processor accumulates the coherent integrations as a signal energy and instructing to execute a specific operation such as signal tracking when said signal energy exceeds a threshold. Once the signal energy drops below the threshold, the processor requests to suspend the operation or enter the re-acquisition stage.

By using method and apparatus of the present invention, the non-coherent integration window is much more flexible and effective compared to those used in conventional spreading signal receivers.

BRIEF DESCRIPTION OF THE DRAWINGS

Proposed invention will be further described in details in conjunction with the accompanying drawings, wherein.

DETAILED DESCRIPTION OF THE INVENTION

Figure 1:
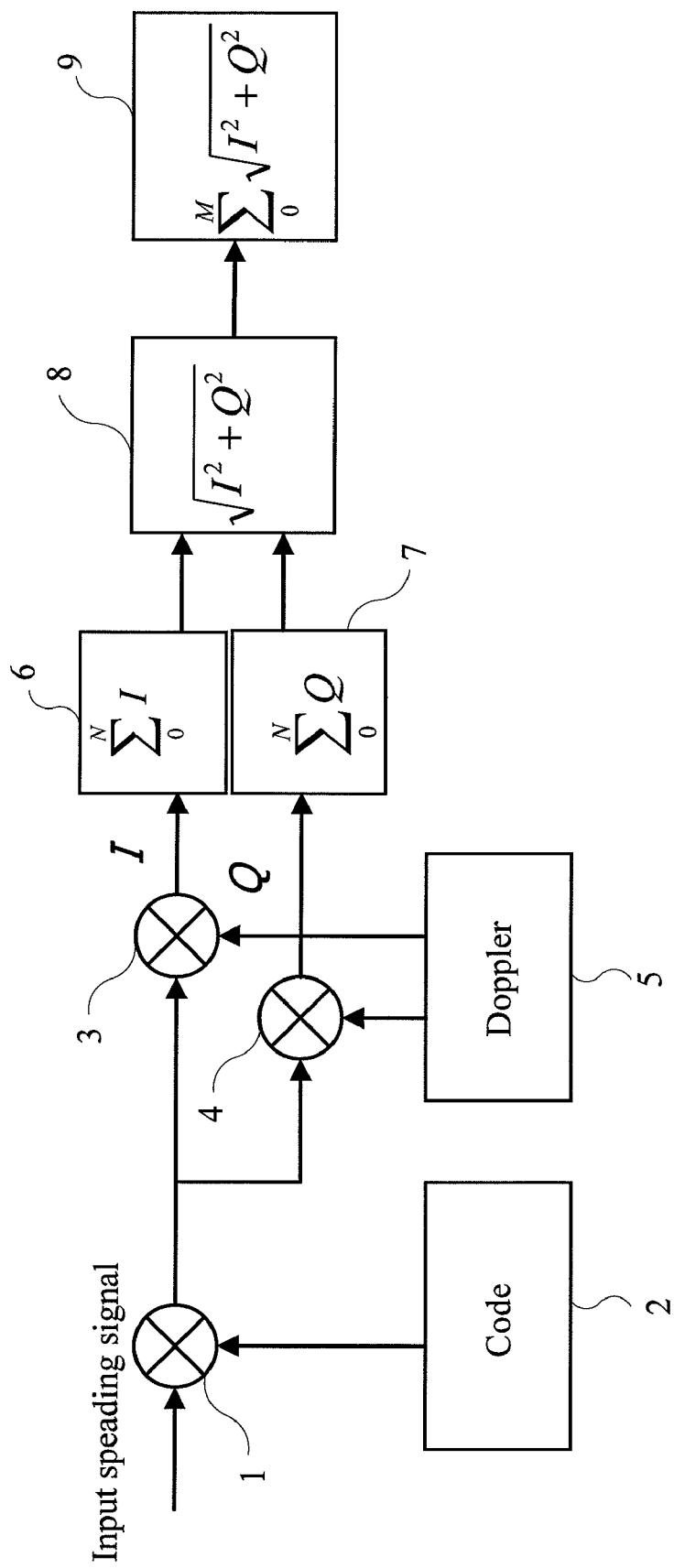
FIG. 1 is a diagram schematically illustrating coherent integration and non-coherent integration.
Figure 2:
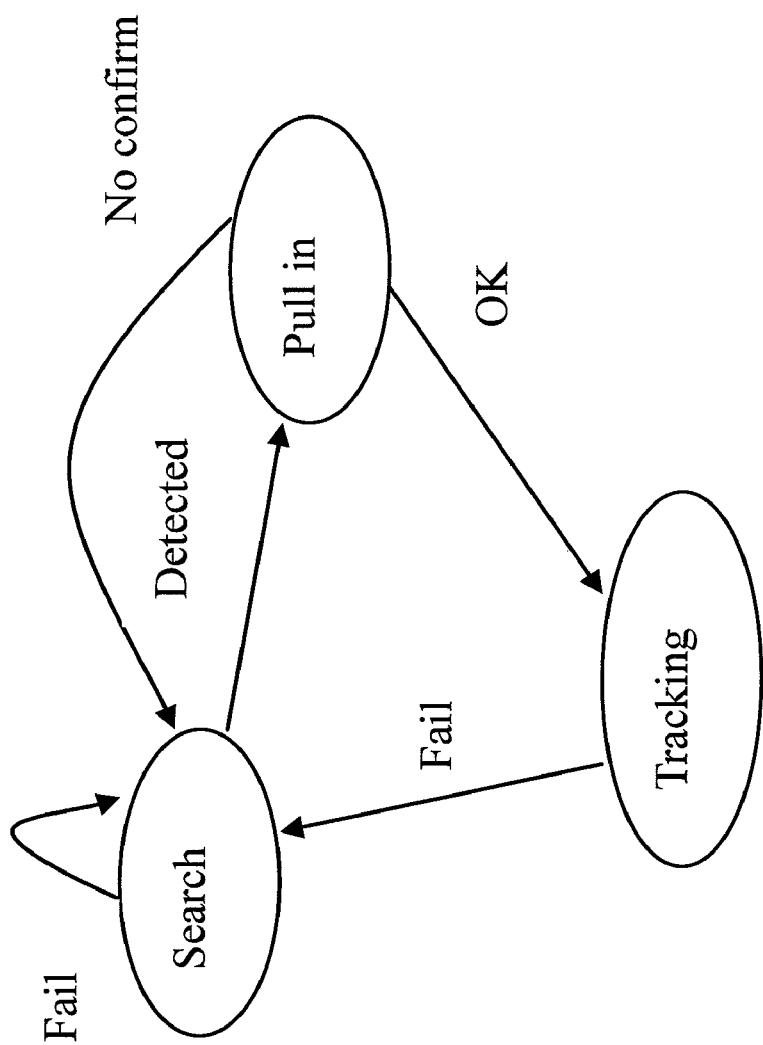
FIG. 2 is a state diagram of a GPS signal receiving channel.
Figure 3:
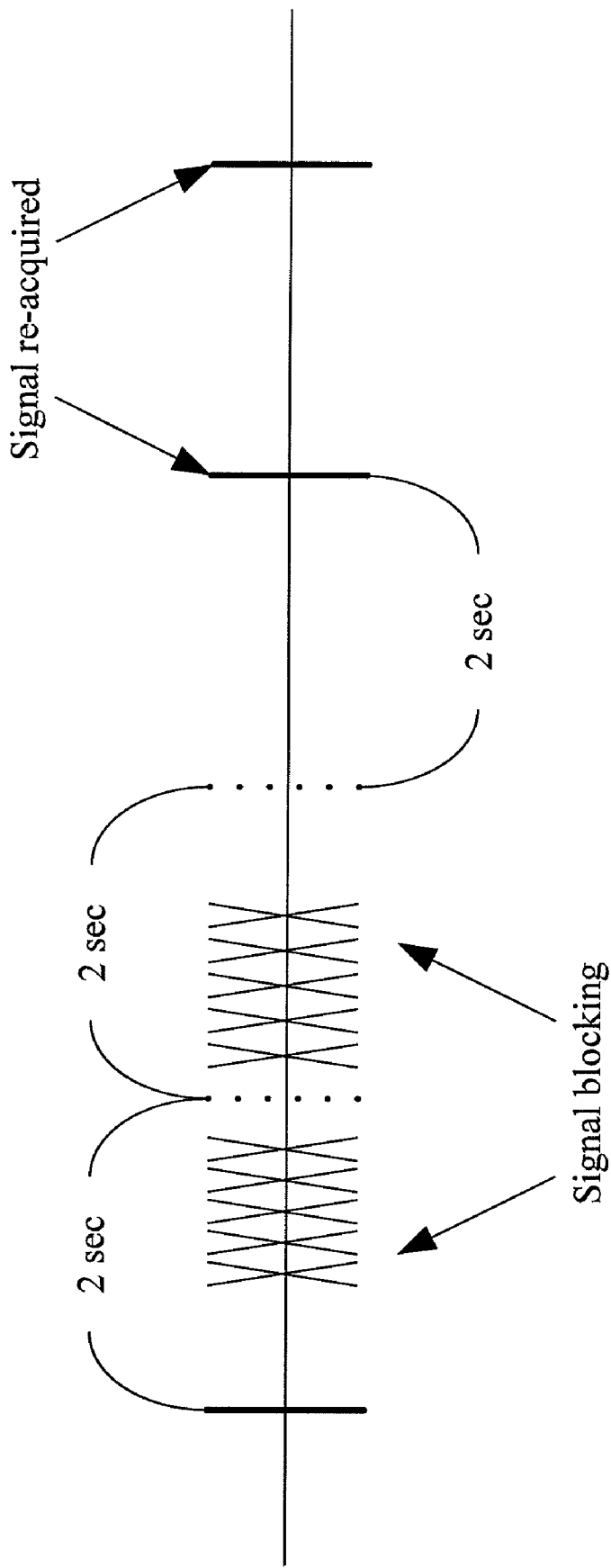
FIG. 3 is a schematic illustration showing a signal integration scheme for spreading signal acquisition and tracking in prior art.
Figure 4:
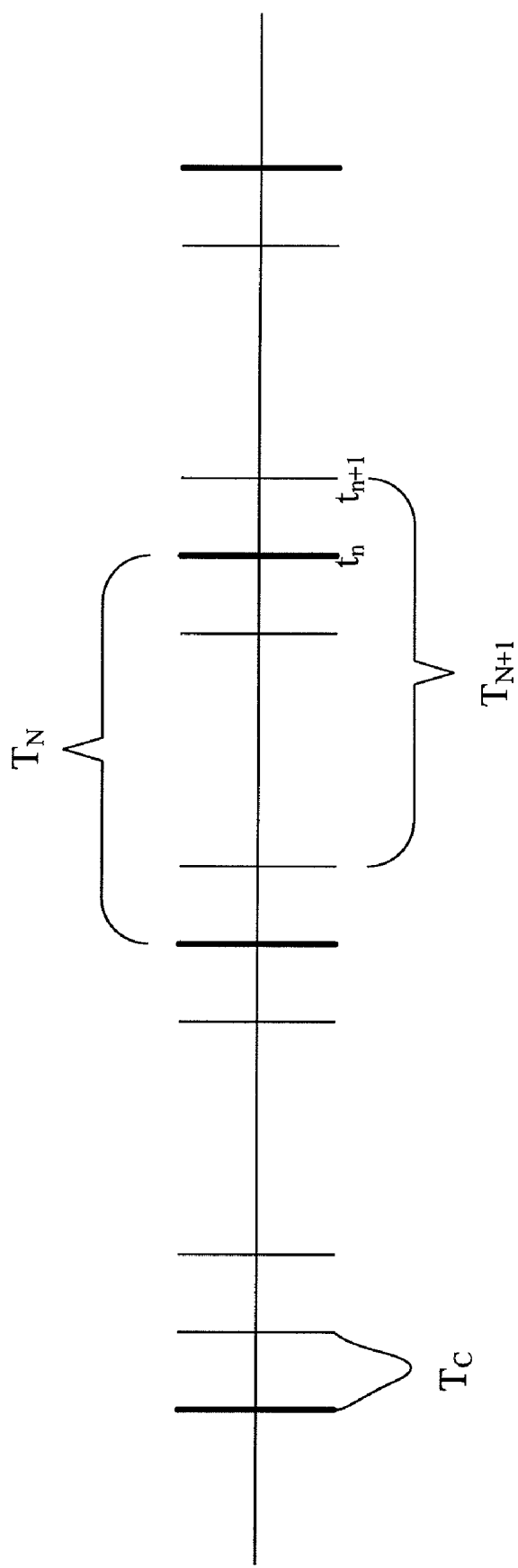
FIG. 4 is a schematic illustration showing a signal integration scheme for spreading signal acquisition and tracking according to the present invention.

Spreading signal acquisition and tracking scheme in accordance with the present invention will be described as follows. With reference to FIG. 4, assuming that the chosen coherent integration interval $T_C$ is 20 msec and the magnitude (or the power) of 100 coherent integrations are summed to make a non-coherent integration of 2 sec. For the sake of convenience of description, the number 100 is referred to as a non-coherent count N. The coherent integration interval $T_C$ can be of any other proper period of time depending on various conditions. Say, at initial satellite search stage, when data bit sync is not known previously or the secondary code sequence is not synchronized, a smaller coherent integration length, say 1 or 4 ms, is chosen for integration. However, after the signal bit sync or secondary code is synchronized, a higher coherent integration length can be used for better tracking sensitivity. The non-coherent count N can also be any proper number as desired. Usually, an automatically adjustment method or apparatus is coupled to control the non-coherent integration number N for best compromise between signal to noise ration (SNR) and discriminator update bandwidth.

In the present embodiment, magnitude (or power) of the coherent integration is stored by using an extra memory, called MPRAM, which will be further described later. Then, whenever a new coherent integration is obtained, a new non-coherent integration can be calculated with the coherent integrations from the MPRAM. Assuming that the non-coherent integration interval $T_N$ includes the coherent integrations $T_{C-99}$ to $T_C$, then the next integration interval $T_{N+1}$ should include the coherent integrations $T_{C-98}$ to $T_{C+1}$. That is, the non-coherent integration window sequentially shifted by a step of one coherent integration interval. In this example, the non-coherent integration interval $T_N$ is shifted by a step of one coherent integration interval $T_C$. However, the non-coherent integration interval $T_N$ can be shifted by a step of any other proper period of time, for example, two or other number of coherent intervals $T_C$. The shifting step can even be variable as desired. When the end time point of the non-coherent integration interval $T_N$ is shifted from time $t_n$ to $t_{n+1}$ (i.e. shifted by one coherent integration interval $T_C$ of 20 msec) at the next time, the non-coherent integration of the next (shifted) non-coherent integration interval $T_{N+1}$ is calculated and stored. The coherent integration results within this non-coherent integration interval $T_{N+1}$ are accumulated.

Preferably, whenever a coherent integration result of a new coherent integration interval within the current non-coherent integration interval (e.g. $T_{N+1}$) is accumulated, the coherent integration result of the oldest coherent integration interval of the previous non-coherent integration interval (e.g. $T_N$) is abandoned. By doing so, it is possible to maintain a latest complete integration result of the non-coherent integration interval of two seconds.

Figure 5:
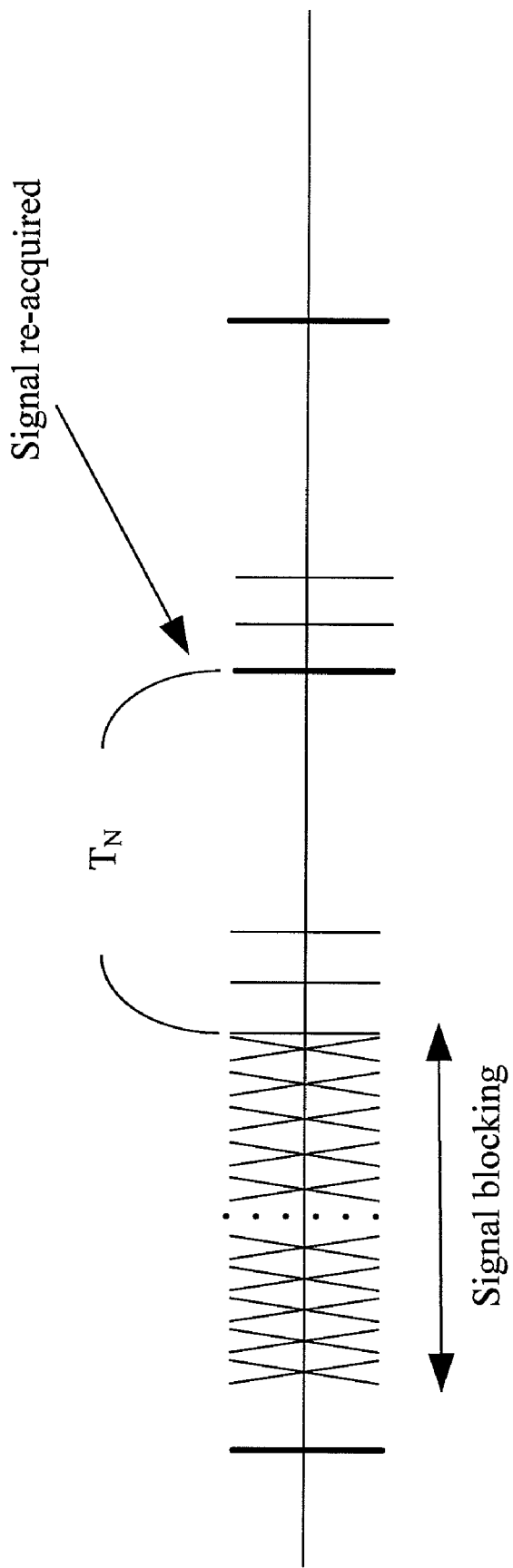
FIG. 5 is a schematic illustration showing the signal integration scheme for spreading signal acquisition and tracking according to the present invention under a condition that deeper blocking occurs during integration.

The benefit of the present invention can be clearly observed from FIG. 5. When there is signal blocking occurrence, by using the scheme of the present invention, a complete integration for a non-coherent integration interval $T_N$ can be obtained in two seconds, for example, immediately after the signal blocking is passed. Therefore, when lost-lock of a satellite signal happens due to signal blocking occurrence, the satellite signal can be re-acquired in a very short period of time by using the method in accordance with the present invention.

Figure 6:
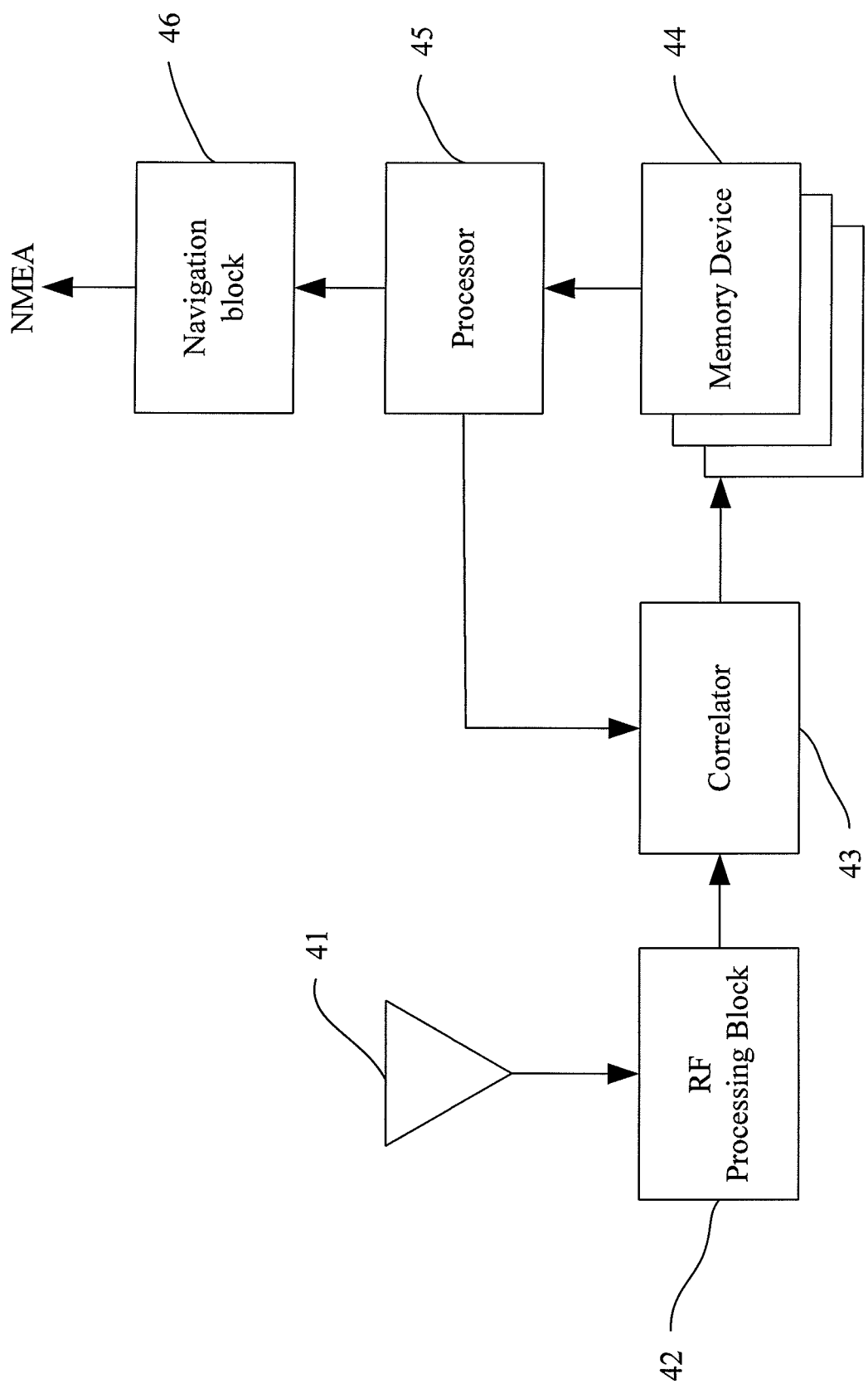
FIG. 6 is a block diagram showing a structure of a spreading signal acquisition and tracking apparatus in accordance with the present invention.

The present invention will be further described in detail with reference to FIG. 6. FIG. 6 is a block diagram showing respective portions of a spreading signal acquisition and tracking apparatus in accordance with the present invention.

The spreading signal acquisition and tracking apparatus in accordance with the present invention includes an antenna 41 for receiving a spreading signal (e.g. a GPS and/or a Galileo signal). The spreading signal received by antenna 41 is sent to an RF processing block 42, which is in charge of all RF related processing, such as down converting, filtering and amplifying the received spreading signal. Output from the RF processing block 42 is then sent to a correlator 43. As commonly known in this field, correlator 43 conducts correlation operation of the received and processed signal to integrate signal energy thereof. The correlator 43 integrates the coherent integration result of the signal for each coherent integration interval $T_C$ and stores the coherent integration results of the coherent integration intervals into a memory device 44. The apparatus further has a processor 45. The processor 45 determines the period of each coherent integration interval $T_C$ and the non-coherent count N. The non-coherent integration is determined as "coherent integration interval non-coherent count". If the coherent integration interval is 20 ms, and the non-coherent count is 100, then the non-coherent integration interval is 20 ms 100=2 sec. That is, a non-coherent integration is an accumulation of 100 coherent integrations.

In the present embodiment, the processor 45 stores coherent integrations result into the memory device 44 (MPRAM) as a memory pool for non-coherent integration. As a new coherent integration is obtained, a new non-coherent can be calculated from the memory pool. Such operations are repeated until a sufficiently high SNR can be obtained. In this embodiment, the shifting step of the non-coherent integration window is one coherent integration interval. That is, the delay between one non-coherent integration interval and the previous one is one coherent integration interval. However, the shifting step can be longer such as two coherent integration intervals or more. The smaller the step is, the better the sensitivity of the apparatus is, with the cost of more memory capacity.

As described, the signal integrated coherently during each coherent integration interval is stored as a coherent integration result, and the coherent integration results within each non-coherent integration interval are accumulated to obtain a signal energy S. The start and end of the non-coherent integration interval are shifted sequentially and gradually.

In another embodiment, the accumulation of the coherent integration results (signal energy S) is monitored as the coherent integration is added one by one. When the signal energy S (accumulation of the coherent integration results) achieves or exceeds a threshold $S_{TH}$, the processor 45 passes the signal to a following block to execute successive operation, such as signal tracking. That is, the processor 45 does not necessarily pass the signal to the successive operation until the signal energy for a whole non-coherent integration interval is obtained. The signal is passed to a navigation block 46 when the signal energy S is high enough, so that the navigation block 46 may generate navigation information for use. Generally, the signal energy S is required to be sufficiently larger than a predetermined threshold which is obtained from probability of false alarm rate analysis for a period of time. It is noted that the threshold can be conditionally and dynamically changed as required.

In the embodiment, as described above, the signal is coherently integrated for each coherent integration interval, and the coherent integration results thereof are stored into the memory 44 device (FIG. 6). The coherent integration results of the coherent integration intervals within the non-coherent integration interval are accumulated to obtain the signal energy S. It is noted that the signal energy S is able to be updated whenever the coherent integration result of a new coherent integration interval is accumulated. When the memory resource is limited, the arrival of a new coherent integration result will discard the oldest coherent integration interval to avoid saturation of the limited memory. The processor 45 (FIG. 6) determines if the signal energy S is greater than the threshold $S_{TH}$. If so, signal tracking is triggered. For a GNSS receiver, a code loop and a carrier loop thereof are dynamically adjusted during signal tracking as commonly known. Whenever the signal energy S drops below $S_{TH}$, the signal tracking is suspended. It is noted that the whole process proceeds continuously and repeatedly. Once the signal energy S exceeds the threshold $S_{TH}$, signal tracking is started. When the signal energy S drops below the threshold, signal tracking is held.

Using the present invention to acquire a satellite spreading signal (e.g. a GPS signal), the non-coherent integration window is sequentially and gradually shifted step by step, and the coherent integration results are continuously accumulated. Each step is far less than the non-coherent integration interval. In the embodiment, each step is the time length of one coherent integration interval. Accordingly, sufficient signal energy for the satellite signal can be rapidly obtained and well maintained, even if the signal intensity is weak and deeper signal blocking occurs.

While the preferred embodiments of the present invention have been illustrated and described in details, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A spreading signal acquisition and tracking method, said method comprising steps of:
   receiving a spreading signal;
   coherently integrating the spreading signal to obtain a coherent integration result of a coherent integration interval;
   accumulating a first number of the coherent integration results from a first time point to obtain a non-coherent integration result; and
   accumulating the first number of the coherent integration results from a second time point to obtain another non-coherent integration result, said second time point being later than said first time point by a second number of the coherent integration intervals.

2. The method of claim 1, wherein said second number is less than said first number.

3. The method of claim 2, wherein said second number is one.

4. The method of claim 2, wherein said second number is variable.

5. The method of claim 1, wherein the coherent integration result is stored in a memory device and the non-coherent integration result can be calculated from that the coherent integration results stored in memory device.

6. A spreading signal acquisition and tracking method, said method comprising steps of:
   receiving a spreading signal;
   coherently integrating the spreading signal to obtain a coherent integration result of a coherent integration interval;
   storing the coherent integration result into a memory device;
   non-coherently accumulating the coherent integration results from the memory device to obtain a signal energy;
   comparing the signal energy to a threshold; and
   executing a specific operation when said signal energy achieves said threshold,
   wherein said threshold is obtained by analyzing probability of false alarm rate.

7. The method of claim 6, wherein the spreading signal is a global navigation satellite signal.

8. The method of claim 6 further comprising suspending said specific operation whenever the signal energy drops below the threshold.

9. A spreading signal acquisition and tracking apparatus comprising:
   an antenna receiving a spreading signal;
   an RF processing block for down converting, filtering and amplifying the received signal;
   a correlator for coherently integrating the received signal to obtain a coherent integration result for a coherent integration interval;
   a memory device; and
   a processor accumulating a first number of the coherent integration results from a first time point to obtain a first non-coherent result, storing the first non-coherent result into said memory device, accumulating the first number of the coherent integration results from a second time point to obtain a second non-coherent result, and storing the second non-coherent result into said memory device,
   wherein said second time point being later than said first time point by a second number of the coherent integrations-intervals.

10. The apparatus of claim 9, wherein said second number is less than said first number.

11. The apparatus of claim 10, wherein said second number is one.

12. The apparatus of claim 10, wherein said second number is variable.

13. The apparatus of claim 9, wherein the oldest coherent integration result is discarded from the memory device when a new coherent integration result is obtained.

14. A spreading signal acquisition and tracking apparatus comprising:
   an antenna receiving a spreading signal;
   an RF processing block for down converting, filtering and amplifying the received signal;
   a correlator for coherently integrating the received signal to obtain a coherent integration result for a coherent integration interval;
   a memory device for storing the coherent integration result; and
   a processor non-coherently accumulating the coherent results stored in the memory device to obtain a signal energy, and instructing to execute a specific operation when the signal energy achieves a threshold,
   wherein said threshold is obtained by analyzing probability of false alarm rate.

15. The apparatus of claim 14, wherein the processor requests to suspend said specific operation whenever the signal energy drops below the threshold.

16. The apparatus of claim 14, wherein said threshold is variably set according to different requirements.

17. The apparatus of claim 16, wherein the requirements comprise a trade off between signal searching or tracking ability and signal integrity.

18. The apparatus of claim 14, further comprising a navigation block, said processor requests said navigation block to execute signal tracking when the signal energy achieves said threshold.

19. The apparatus of claim 18, wherein said processor requests said navigation block to suspend signal tracking when the signal energy drops below said threshold.

* * * * *